United States Patent
Mahe

(10) Patent No.: US 9,193,104 B2
(45) Date of Patent: Nov. 24, 2015

(54) INJECTION-MOULDED ARTICLE COMPRISING A FIELD OF HOOKS OBTAINED BY MOULDING

(71) Applicant: APLIX, Paris (FR)

(72) Inventor: Anthony Mahe, St Julien de Concelles (FR)

(73) Assignee: APLIX, Paris (FR)

( * ) Notice: Subject to any disclaimer, the term of this patent is extended or adjusted under 35 U.S.C. 154(b) by 0 days.

(21) Appl. No.: 14/228,291

(22) Filed: Mar. 28, 2014

(65) Prior Publication Data

US 2014/0212538 A1 Jul. 31, 2014

Related U.S. Application Data

(62) Division of application No. 12/737,300, filed as application No. PCT/FR2009/000769 on Jun. 24, 2009.

(30) Foreign Application Priority Data

Jul. 1, 2008 (FR) ...................................... 08 03707

(51) Int. Cl.
- *B29C 45/32* (2006.01)
- *B29C 45/56* (2006.01)
- *B29C 45/27* (2006.01)
- *B29L 31/00* (2006.01)

(52) U.S. Cl.
CPC ............. *B29C 45/56* (2013.01); *B29C 45/2701* (2013.01); *B29C 45/2725* (2013.01); *B29L 2031/729* (2013.01)

(58) Field of Classification Search
CPC .......................... B29C 45/2725; B29C 45/2701
USPC ......................... 425/570, 572, 573; 264/328.7
See application file for complete search history.

(56) References Cited

U.S. PATENT DOCUMENTS

| 3,016,574 A | * | 1/1962 | Fischer et al. ................. 425/170 |
| 4,164,531 A | * | 8/1979 | Shiraki et al. ................. 264/115 |

(Continued)

FOREIGN PATENT DOCUMENTS

JP          2139211        *   5/1990

OTHER PUBLICATIONS

Franklin D. Yeaple, Hydraulic and Pneumatic Power and Control, 1966, McGraw-Hill Book Company, pp. 268,269.*

*Primary Examiner* — Tim Heitbrink
(74) *Attorney, Agent, or Firm* — Renner, Kenner, Greive, Bobak, Taylor & Weber

(57) ABSTRACT

One-piece article obtained by injection molding, with at least one injection point, said article comprising a main body (20), having a body volume defined by the space within a surface forming an outer envelope, and at least one hook (21), preferably a field of hooks, obtained from the same molding of the main body of the molded article, the hook or each hook having a stem of longitudinal axis and a catching part projecting laterally from the stem, characterized in that the volume of the hooks is substantially smaller than the volume of the body, i.e at least 100 times smaller, preferably at least 1000 times smaller, for example between 100 000 and 100 000 000 times smaller, than the volume of the body, and in that the width, or smallest transverse dimension, of the stems, measured transversely to the longitudinal axis, is smaller than the thickness of the main body, measured along the longitudinal axis of the stems.

18 Claims, 4 Drawing Sheets

(56) References Cited

U.S. PATENT DOCUMENTS

| | | | |
|---|---|---|---|
| 4,442,061 A * | 4/1984 | Matsuda et al. | 264/328.7 |
| 6,224,364 B1 * | 5/2001 | Harvey | 425/130 |
| 6,440,351 B1 * | 8/2002 | Saito et al. | 264/328.7 |
| 2002/0036360 A1 * | 3/2002 | Nishimoto | 264/2.2 |
| 2005/0285310 A1 * | 12/2005 | Nagi et al. | 264/328.7 |
| 2011/0285058 A1 * | 11/2011 | Kobayashi et al. | 264/328.7 |

* cited by examiner

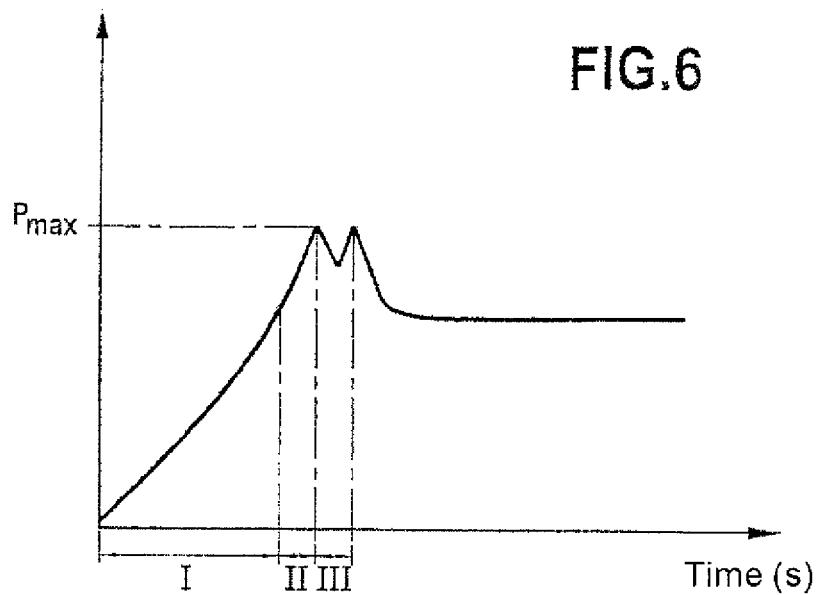
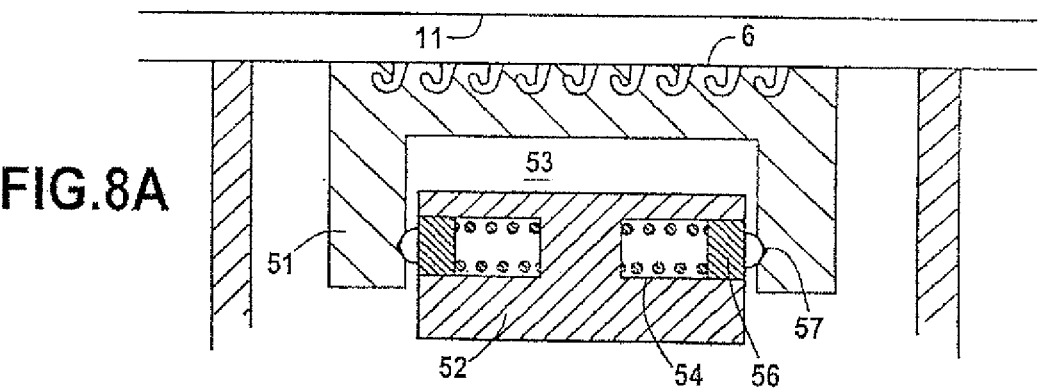
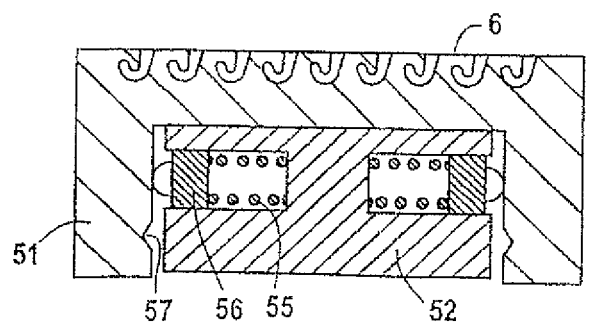

INJECTION-MOULDED ARTICLE COMPRISING A FIELD OF HOOKS OBTAINED BY MOULDING

CROSS-REFERENCE TO RELATED APPLICATION

This application is a division of U.S. patent application Ser. No. 12/737,300 filed on Dec. 28, 2010, which is incorporated herein by reference in its entirety.

The present invention relates to an article which is in a single piece, obtained by injection moulding at one injection point at least, consisting of a main body with a body volume which is defined by the space within an outer surface, the moulded article being for example an inner door panel of a motor vehicle.

The invention also relates to a device forming an injection mould which is designed to form by injection moulding a moulded article of this type, as well as a block which forms a moulding insert which is designed to be inserted in a mould of the aforementioned type.

Moulded articles of this type are already known in the prior art.

The intention is to add to the outer surface of the article at least one hook, and preferably a field of hooks:

1) which is obtained from the same moulding as the main body, and is integral with the latter;

2) which has a volume of hooks which is substantially smaller than the volume of the body, i.e. at least a hundred times smaller, preferably at least a thousand times smaller, and for example between 100,000 and 100,000,000 times smaller than the volume of the body; and 3) the hooks of which are thin, i.e. which have their smallest transverse dimension at the level of their base which is smaller than the thickness of the article at the level of the base, measured along the straight line which is perpendicular to the surface.

The or each hook is designed to form the male part of a self-gripping device with hooks and loops, or hooks in hooks, in order to co-operate in particular for example with loops or hooks of another article in order to secure the moulded article to this other article.

In the present application, hook means an element comprising a stem and a catching part which projects laterally from the stem, in particular a harpoon, a double hook, a mushroom and the like.

Hitherto in the prior art, in particular as described in EP-B1-0,577,697, it has already been possible by moulding a part in a single mould to provide plates with hooks comprising a plate with a small thickness and thick hooks, which in particular have a width greater than the thickness of the plate. However, by means of the method described, it is not possible to obtain hooks which have a very small width dimension of their stem.

In EP-B1-0,577,697 an injection mould is used in order to form the object moulded (an orthopaedic knee piece) on the outer surface of which there is formed by moulding in the same mould a field of hooks which are then designed to co-operate with loops. Conventionally, part of the inner surface of the mould comprises a field of cavities with a form which is approximately complementary to the hooks to be produced. This field of cavities is disposed in a position which is suitable for the hooks to be formed in the precise location where they are to be formed on the final moulded article. There is then injection into the mould of the moulding material, which in particular is thermoplastic, and fills the inner space of the mould and also the moulding cavities of the hooks, in order thus to obtain the moulded article comprising a field of hooks produced integrally with part of the outer surface of the article.

However, this mould and this method do not make it possible to manufacture the moulded article with hooks with a small volume and/or a small width.

In fact, the disadvantage is that the pressure of the injection of the thermoplastic material is not sufficient for the latter to penetrate efficiently into the cavities for formation of the hooks, which cavities have a small dimension relative to the volume of the final object.

There is already known from the prior art, and in particular from the American patent U.S. Pat. No. 6,224,364, a system based on over-moulding which makes it possible to improve the quality of filling of the cavities of the field of cavities by the thermoplastic material, and to obtain hooks with a smaller height and width than the thickness of the article at the level of the hooks. However, the technology which is proposed in this prior document has several disadvantages. Firstly, the final article obtained is not in a single piece, but is in two pieces which are over-moulded on one another, and are separated by an interface in the material itself of the article, which separates the hooks from most of the rest of the article. However, this interface involves fragility of the article which is detrimental to its service life. In fact, this interface can ultimately constitute an area of reduced resistance to the traction of the hooks, and give rise to rapid deterioration of the moulded article, and in particular to detachment of the area of the field of hooks from the moulded article, thus making the latter unusable in co-operation with another article with loops or hooks to which it is to be secured. Furthermore, the device which forms a mould has a complicated design, which makes it essential to provide a plurality of openings for injection of the material, and in particular an opening for injection opposite the field of cavities for formation of the hooks, and to have a part which is mobile relative to the rest of the mould, which causes difficulties both of design and use, in particular in terms of sealing and long-term reliability. In addition, once the mould has been constructed, it is possible to modify only with difficulty the position of this field of cavities anywhere in the mould, without manufacturing the mould entirely once more. The method thus described also has the disadvantage of being in two stages, which extends the manufacturing time of the final moulded article.

According to the invention, it has been possible to obtain for the first time an article which is in a single piece obtained by injection moulding at one injection point at least, consisting of a main body with a body volume which is defined by the space within a surface which forms an outer envelope, and at least one hook, and preferably a field of hooks, which is obtained from the same moulding as the main body of the moulded article, the hook or each hook having a stem with a longitudinal axis, and a catching part which projects laterally from the stem, characterised in that:

the volume of the hooks is substantially smaller than the volume of the body, i.e. at least a hundred times smaller, preferably at least a thousand times smaller, and for example between 100,000 and 100,000,000 times smaller than the volume of the body; and the width, or smallest transverse dimension of the stem, measured transversely to the longitudinal axis, is smaller than the thickness of the main body, measured along the longitudinal axis of the stem.

Preferably, the largest height dimension of the hook or each hook, measured along the longitudinal axis, is smaller than the thickness of the main body measured along the longitudinal axis of the stem.

Preferably, the field of hooks covers only a small part of the outer surface, which in particular is strictly less than half this outer surface, and is preferably less than 30%.

Preferably, the width of the base of the stem is less than 0.29 mm, and in particular it is between 0.05 and 0.15 mm.

In order to obtain a moulded article of this type, according to another aspect of the invention, it is possible to use a device which forms a mould, in order to form a moulded article by injection of a moulding material, which in particular is thermoplastic, comprising an inner closed surface which defines a main moulding chamber, at least one opening for the introduction of the moulding material being formed in order to be able to introduce the moulding material by injection into the moulding chamber, at least one cavity with a form complementary to at least one hook, and preferably a field of cavities, opening onto a part of the inner surface, the said one part of the inner surface being surrounded by an edge surface which does not comprise a cavity, characterised in that means are provided for thrusting at least part of the edge surface and an opposite part of the inner surface towards one another, the arrangement being such that the thrusting by the thrust means is limited, such that the two surfaces which are thrust towards one another cannot come into complete contact with one another, and in particular there is always a gap between the two surfaces.

The present invention overcomes the disadvantages of the devices according to the prior art by proposing a device which forms a mould with a simple design, which in particular may need only a single opening for the introduction of the thermoplastic material, and makes it possible to obtain a final moulded article comprising hooks which are integral with the moulded article, whilst being able to position the field of hooks on substantially any location of the outer surface of the moulded article, and which makes it possible to obtain a moulded article and a field of hooks which are truly integral, and in particular does not comprise an interface between the main part of the article and the field of hooks, which have a small dimension in relation to the body of the article.

In the known systems of the type described in U.S. Pat. No. 6,224,364, the thermoplastic material which is designed to form the hooks is not assisted in penetrating into the cavities in a manner which is more forceful than in the prior systems in which the cavities for formation of the hooks are positioned such that the latter are formed at the end of filling of the moulding cavity. In particular, the inventors of the present invention have realised that a phenomenon occurs which can be classified as hesitation, which consists of the material "hesitating" to penetrate into the cavities for formation of hooks, and a type of skin then forms which blocks the opening of the cavity and prevents the material from penetrating into it, such that, when the moulded article is extracted from the mould, it does not have hooks, or hooks are missing from the field in relation to the number of cavities. According to the invention on the other hand, there is improvement of the penetration of the material into the cavities, for the same thermoplastic material and form of the cavities of the hooks, by assuring that the pressure of introduction of the thermoplastic material into the cavities for moulding of the hooks is very great, very quickly, and in particular is faster than in the systems previously known. This rapid increase in the pressure has the effect of increasing the speed at which the material arrives in front of the openings of the cavities, thus tending to prevent the formation of the skin as occurs in the prior art, and therefore makes it possible to obtain hooks with a relatively small volume.

According to a preferred embodiment, the main moulding chamber has a form which is substantially complementary to the article to be moulded.

Preferably, the gap has a very small dimension, and in particular is between 0.01 and 0.1 mm.

According to the invention, this gap is measured in the direction perpendicular to the two surfaces which face the point(s) of the said one surface part furthest away from the opposite surface.

In particular, this gap or play is very much smaller than the depth of the cavities with a form complementary to the hooks, and in particular at least ten times smaller, and preferably at least a hundred times smaller.

Thus, according to the invention, it is no longer necessary to provide an opening which opens into the said opposite surface in order to form the part with hooks, after most of the moulded article has been formed. In particular, it is possible to introduce the thermoplastic moulding material via a single opening, and this thermoplastic material will fill all of the main chamber, with the exception of the gap between the surface with hooks and the opposite surface, the dimension of the gap being in fact selected to be so small that the thermoplastic material cannot penetrate into it unless a pressure corresponding to that which prevails when substantially all of the chamber is filled with moulding material is applied to it, and it is only when most (i.e. apart from the gap) of the chamber has been filled, with the pressure of the thermoplastic material increasing, that the latter will be able to infiltrate into the gap, whilst going against the force created by the thrust means. As soon as the material starts to infiltrate in the gap, the force applied by the material becomes far greater than the thrust force. The volume above the cavities is then suddenly freed, and the material then fills the volume, as well as the cavities which form the hooks, very rapidly, under very a high pressure, in the manner of an explosion.

Since the moulding is carried out in a single step of introduction or injection of the thermoplastic material into the mould, there is no need to wait to mould the hooks, as was the case in the prior art, for most of the thermoplastic material to have cooled, in order, then, to form the hooks, and consequently no interface is formed in the material between the field of hooks and the rest of the moulded article, and the moulded article and the hooks are formed uniformly in a single piece. One of the particular features of the product obtained is that the material penetrates via the entire periphery of the area which is thrust, whilst gathering in a central area according to a pattern which can be a point, a line or a star, according to the form of the field of hooks. Since the material front does not have the time to cool because of the speed of the operation, the joining area does not constitute a true interface (in particular there is no interface visible to the naked eye) between the hooks and the rest of the moulded article, and consequently this does not constitute an area of greater fragility of the part. In particular, only an analysis of molecular orientation would make it possible to reveal this area.

Preferably, the at least one opening, and in particular the introduction opening(s), in particular for injection of thermoplastic material into the mould, open(s) into the moulding chamber at a part of the inner surface which does not comprise the said opposite surface.

According to a preferred embodiment, the entire edge area is maintained spaced from the opposite surface part.

According to a preferred embodiment, the edge area and the inner surface are in continuity with one another, and are maintained spaced from the opposite surface.

According to another possible embodiment, the edge area is constituted by a shoulder of the inner surface part, and only the edge part is maintained spaced from the opposite surface.

According to another possible embodiment, the edge area comprises a curved part which comes into contact with the opposite surface at its top, with the rest of the edge area being maintained spaced from the opposite surface.

According to a preferred embodiment, only a part of the edge area is maintained spaced from the opposite surface.

According to a particularly preferred embodiment, an insert block is provided which comprises an upper surface in which there is formed a cavity or a field of cavities with a form complementary to hooks, which is disposed in a detachable manner within the moulding cavity, in particular in a location where the hooks in the final article are to be formed, and the thrust means are integrated in the insert block, with the upper surface of the insert block constituting the said inner surface part of the mould.

Thus, in order to form the field of hooks in any location in the moulded article, the insert block is placed in the moulding cavity in the location where the hooks are to be formed, without being restricted by a pre-existing design of the mould.

According to a preferred embodiment of the invention, the thrust means consist of at least one spring. It is also possible for the thrust means to be constituted by a hydraulic or pneumatic jack.

The present invention also relates to an insert block as used in a mould device according to the invention.

The present invention also relates to a method for manufacturing by moulding of a moulded article comprising a hook or a field of hooks obtained integrally with part of its outer surface, which consists of taking a device which forms a mould according to the invention, and injecting thermoplastic material via an opening, in a single step of introduction, in particular of injection.

For example in the case of a motor vehicle door panel, the ratio may be greater than $10^5$.

Preferably, the hook has a size or height smaller than 0.9 mm, and in particular between 0.2 mm and 0.7 mm. In particular, the moulded article comprises on its outer surface at least one area in the form of a hollow or point, corresponding to the point of injection of the material during manufacture by injection moulding of the moulded article.

By way of example, a description is now provided of a preferred embodiment of the invention, with reference to the drawings, in which:

FIG. 6 is a diagram representing the curve which gives the injection pressure of the thermoplastic material as a function of time during implementation of the moulding method according to the invention;

FIGS. 8a and 8b represent another embodiment of a device according to the invention, wherein the parts which have the same functions as the embodiments in the other figures have the same numerical references; and FIG. 9 represents in transverse cross-section the moulded article obtained at the end of the moulding step in FIG. 4a.

Figure 1:
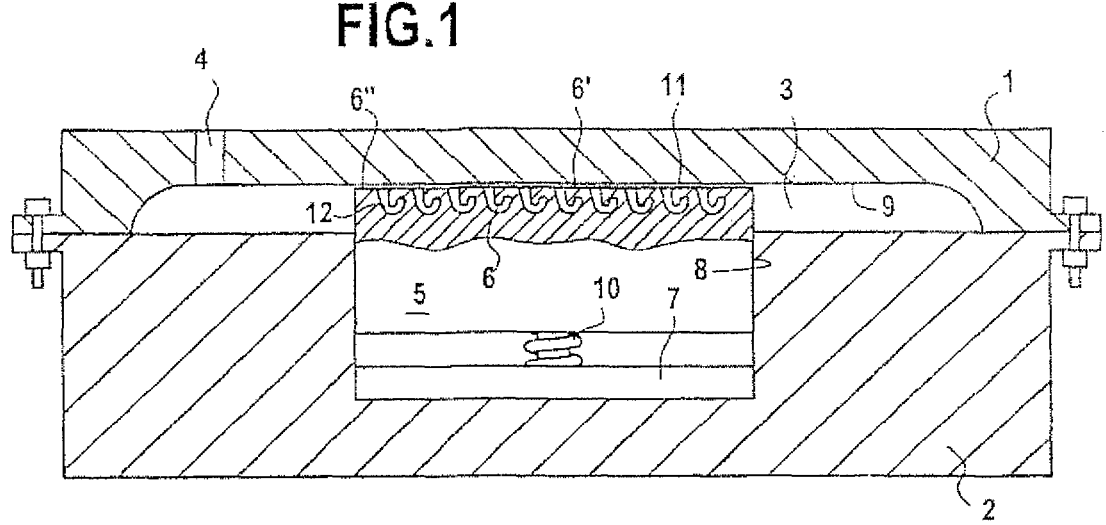
FIG. 1 is a view in transverse cross-section of a device which forms a mould according to the invention.

FIG. 1 represents a mould constituted mainly by two parts 1 and 2, which are closed on one another in order to define a moulding chamber 3 with the form of the article to be moulded. An opening 4 for introduction by injection of the thermoplastic moulding material is formed in the upper part 1. An insert block 5 is disposed in the moulding chamber 3. The insert block 5 can be disposed substantially anywhere in the cavity. However, it is ensured that it is not located opposite the opening 4.

Figure 2:
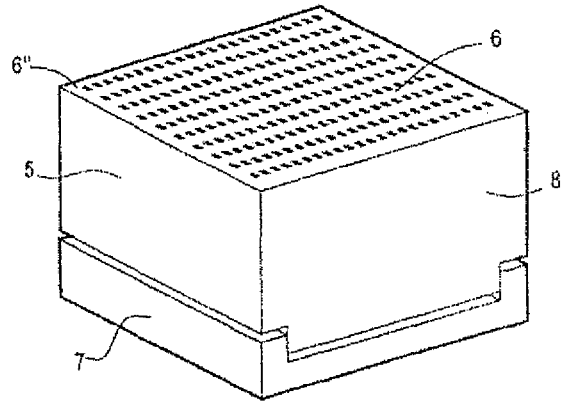
FIG. 2 is a view in perspective of the insert block of the device which forms a mould in FIG. 1.
Figure 3:
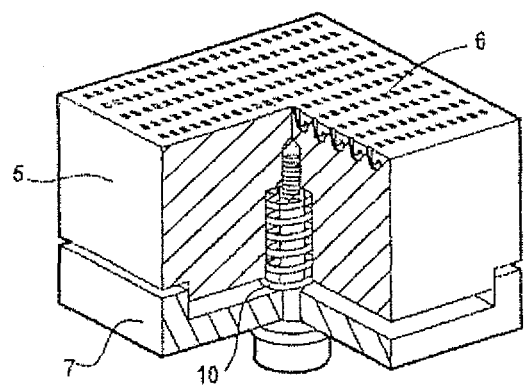
FIG. 3 is a partially cut-out view of FIG. 2.

The insert block 5, which can be seen better represented in FIGS. 2 and 3, is constituted substantially by a rectangular parallelepiped block with an upper surface 6 in which there is formed a field of cavities 12 with forms complementary to hooks to be formed on an outer surface of the moulded article. The insert block comprises a parallelepiped base block 7 and a mobile block 8. The block 7 is designed to be secured (preferably in a detachable manner) relative to the inner surface 9 of the chamber 3, whereas the block 8 is mobile relative to the block 7, and thus also relative to the mould. A spring 10 is integrated in the block 5, and thrusts the mobile block 8 towards a part of the inner surface of the chamber, and in particular towards a part 11 of this surface which is substantially opposite the upper surface 6 of the mobile block 8 which comprises the cavities 12 with forms complementary to the hooks. The upper surface 6 of the mobile block can be subdivided into two parts, i.e. a central part 6' which is delimited by the outermost hook cavities, and an edge 6" which surrounds the central part 6'.

The spring is regulated such that, when unloaded, i.e. without the pressure in particular of the thermoplastic material injected into the cavity, the upper surface 6 is at a short distance from the surface 11, and in particular such that a gap or play of approximately 0.01 to 0.1 mm is formed. This play is such that the two surfaces 6 and 11 are not in complete contact with one another, and are however such that thermoplastic material cannot infiltrate into it until all of the chamber, apart from the gap and the cavities 12, has been completely filled. In particular, the edge part or area 6" without a cavity of the upper surface 6 is maintained spaced from the surface part 11 opposite.

This play represents 1/10 to 1/100 of the depth of the cavities with a complementary form of the moulds (or of the height of the hooks).

It should be noted that the upper surface 6 of the insert 5 has a small dimension relative to the inner surface 9, such that the insert is totally surrounded by the remaining volume of the chamber 3.

The use of the device which forms a mould is as follows. Fluid thermoplastic material is injected via the opening 4 in order to form a moulded article with a form which is complementary to the chamber 3. Initially, the thermoplastic material is introduced into the volume where the resistance to its progression is the least great, i.e. it fills all of the chamber 3 with the exception of the gap between the surface 11 and the surface 6, this gap being too small for the thermoplastic material to be able to be introduced into it by itself without pressure, or at a pressure lower than that which exists when the entire chamber 3 is filled. Once substantially all of the chamber 3 has been filled, with the introduction of the thermoplastic material continuing, the pressure of the latter in the volume occupied in the chamber 3 increases, and the thermoplastic material, under the effect of this pressure, then attacks the gap between the two opposite hook surfaces (6 and 11), and the pressure becomes such that, suddenly, the material is introduced rapidly into this gap and thrusts the insert block, in particular its mobile part 8, against the force of the spring 10. The presence of this spring and the small dimension of the gap mean that the pressure which is necessary in order for the thermoplastic material to begin to be introduced is strong. As a result, the penetration of the thermoplastic material into the gap takes place suddenly, in a manner which is almost identical to an explosion, with great force and great kinetic energy, such that the thermoplastic material is introduced efficiently into the cavities 12 which have forms complementary to the hooks, and the hooks are well "formed".

Once the hooks are formed, introduction of the thermoplastic material is stopped, it is allowed to cool, and the half-mould 1 is opened in relation to the half-mould 2 in order to extract from the chamber 3 the final moulded article, which comprises on its outer surface a field of hooks with forms complementary to the moulding cavities 12 which are on the upper surface 6 of the insert block 5. This field of hooks is integral with the rest of the moulded article, and, in particular, there is no interface which forms a separation in the material of the article.

Figure 4A:
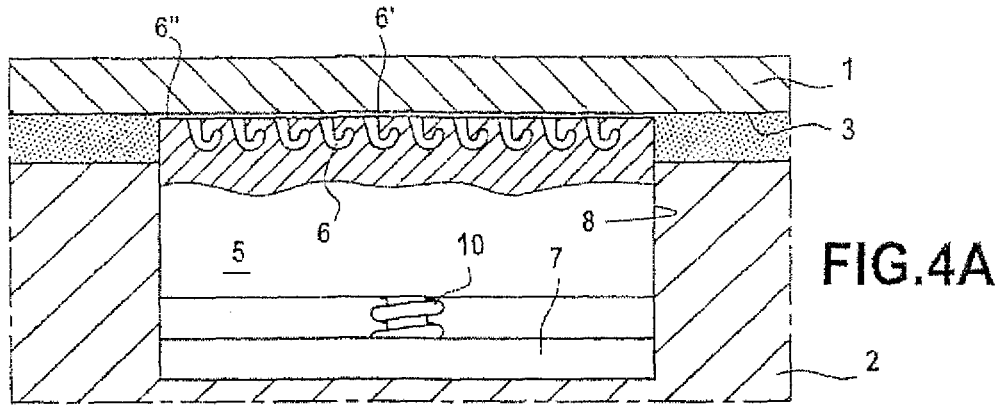
FIGS. 4a, 4b and 4c are diagrams explaining the progression of the moulding operation when the device which forms a mould in FIGS. 1 to 3 is used.
Figure 4B:
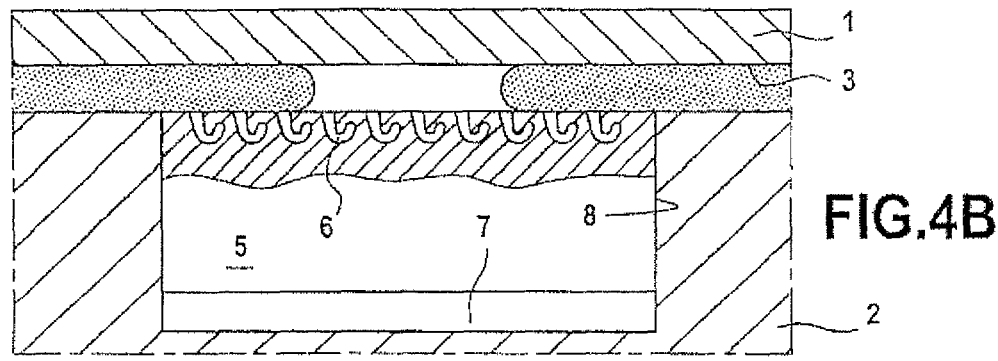
Figure 4C:
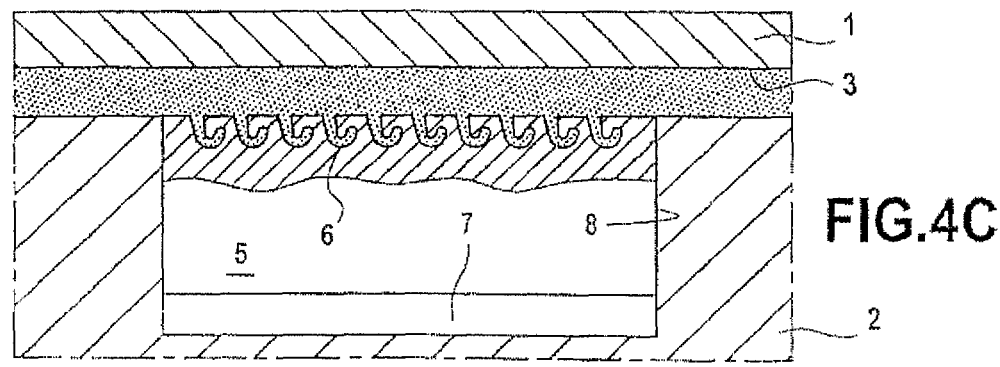
Figure 9:
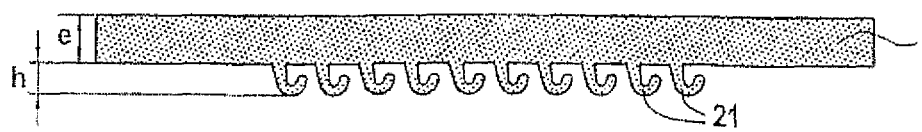

The moulded article which is obtained at the end of the step in FIG. 4C is represented in FIG. 9. It consists of a main body 20 (without hooks) in the form of a plate, and hooks 21 issuing from the plate, whilst being in a single piece and integral with the latter, and in particular obtained from the same mould. In the direction perpendicular to the lower surface of the plate, from which the hooks project, the height h of each hook is smaller than the thickness e of the plate, these two values being measured along the axis of the stem of the respective hook, which in this case is also perpendicular to the outer surface of the body 20. The width of the base of the stem, measured on the plane perpendicular to the axis of the stem, is smaller than the thickness e of the plate. In addition, the field of hooks covers only part of the lower surface of the plate, such that it covers less than 50% of the total outer surface of the plate. In this case it covers less than 30% of the plate, and even in reality less than 10%, in the knowledge that FIG. 9 is a view in cross-section at the level of the hooks, and the field of hooks, in the direction perpendicular to FIG. 9, extends only over a relative dimension in relation to the plate, which is identical to that over which it extends in the direction represented in the figure, this being deduced without difficulty from the form of the insert 5 in FIG. 2, 3 or 5.

Figure 5:
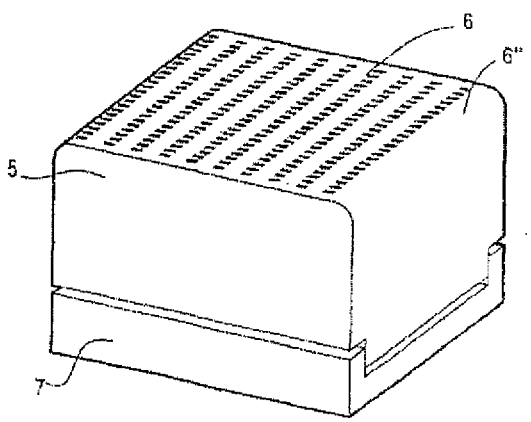
FIG. 5 is a view substantially equivalent to that in FIG. 3 of another possible embodiment of a moulding insert according to the invention.

According to the embodiment represented in FIG. 5, the edge area 6" of the upper surface is curved. This curvature ensures that it is formed in co-operation with the surface part 11, opposite a type of wedge along the peripheral edge, which wedge will make it possible to facilitate the attack of the thermoplastic material, when the latter will be attempting to introduce itself between the two surfaces 6 and 11, which however come into contact with one another at the level of the central area 6'. Nevertheless, the contact between the two surfaces is not complete, since at the level of the peripheral edge area, the two surfaces are not in contact.

According to another embodiment, which is not shown, but is covered by the present invention, it would also be possible to form the cavities in the inner surface 9, in particular in the part 11 of the surface, and to obtain the upper surface 6 from the full block (i.e. without cavities). With an embodiment of this type the advantage is admittedly not obtained of being able to place the field of hooks where required on the final moulded article, however, one of the important effects of the invention is obtained, i.e. the formation of the hooks by means of virtually instantaneous injection.

Figure 7A:
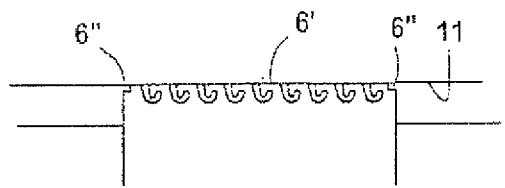
FIGS. 7a, 7b, 7c, 7d, 7e and 7f are diagrams describing a plurality of possible arrangements according to the invention of the edge area, of the surface within the cavities and the opposite surface.

In the embodiment which is represented schematically in FIG. 7a, the edge area 6" is constituted by a shoulder relative to the central area 6', with the thrust means thrusting the surface 6' into contact with the opposite surface 11, but with the shoulder keeping the edge area 6" spaced from the opposite surface.

Figure 7B:
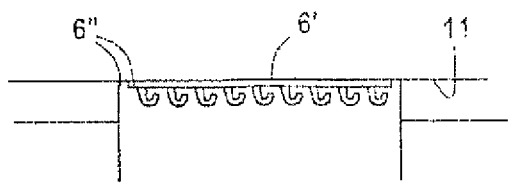

In the embodiment which is represented schematically in FIG. 7b, the edge area 6" comprises curvature which projects relative to the central area 6', with the thrust means thrusting the top of the curvature of the area 6" into contact with the opposite surface 11. However, the sloping part of the curvature on the outer side of the central area 6' is kept spaced from the opposite surface, thus creating a wedge which permits the attack and entry of the thermoplastic material when the pressure becomes sufficient to counter the force of the thrust means.

Figure 7C:
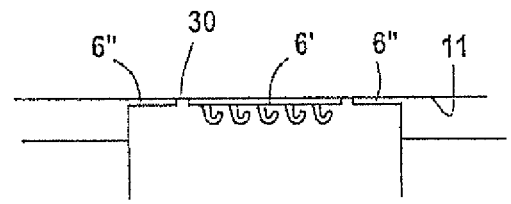

In the embodiment represented schematically in FIG. 7c, two protuberances 30 project from the surface of the central area 6', with the thrust means thrusting these protuberances into contact with the opposite surface 11, but with the rest of the surface 6, and in particular the edge area 6", being kept spaced from the opposite surface.

Figure 7D:
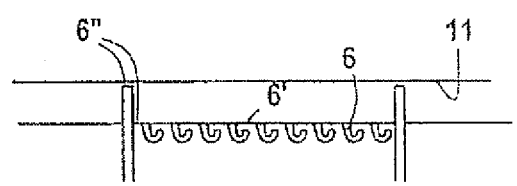

In the embodiment represented schematically in FIG. 7d, only the edge area 6" is thrust by the thrust means, with the central hook area 6' being secured relative to the opposite surface and spaced from the latter. The thrust means thrust the area 6" (which surrounds the central area 6') towards the opposite surface, whilst however keeping it spaced from this opposite surface. When the pressure of the moulding material becomes sufficient to counter the force of the thrust means, the area 6" moves away from the opposite surface, and the material can penetrate into the central area 6'.

Figure 7E:
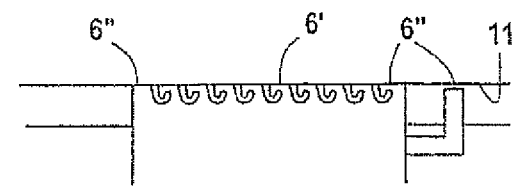
Figure 7F:
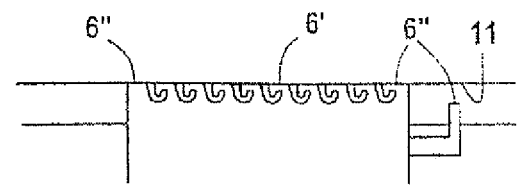

In the embodiments represented schematically in FIG. 7e or 7f, the edge area 6" has a part which is eccentric. The thrust means thrust the upper surface 6 (constituted by the central area 6' and the eccentric edge area 6") towards the opposite surface. The thrust is however limited, such that the eccentric part remains spaced by a small gap from the opposite surface, with the rest of the surface 6 coming into contact with the opposite surface.

FIG. 6 shows schematically the form assumed by the curve which gives the injection pressure of the thermoplastic material, as a function of the time during the manufacture of a moulded article. In a first interval of time I, the pressure rises in a regular increasing manner, corresponding to the filling of the volume of the chamber, apart from the gaps and the hook cavities. After the interval I has elapsed, the pressure increases more rapidly during the interval II, until it reaches a pressure Pmax. During a very short interval III the filling of the gap and the cavities takes place, with the injection pressure decreasing slightly before increasing once more. According to the invention the injection takes place continuously and in a single step.

FIGS. 8a and 8b show another embodiment of a moulding device according to the invention.

As can be seen in FIG. 8a, the insert block 5 consists of two sub-blocks 51 and 52. The upper block 51 defines in its interior, on the side opposite its upper surface 6, a receptacle 53 which is open on the lower side, and receives the sub-block 52. In the sub-block 52 two lateral recesses 54 are formed, which open onto the lateral surfaces of the sub-block 52, and into which there are received respectively two springs 55, each comprising at their free end a lug 56. In the inner lateral walls of the sub-block 51, two notches 57 are formed, with a form which is substantially complementary to the lugs 56.

In the position represented in FIG. 8a, the upper surface 6 is spaced from the surface 11 of the mould. The lugs 56, which are thrust by the springs 55, project from the recesses 54, and penetrate at least partly into the notches 57, such that the two sub-blocks are rendered integral with one another. Starting from this position in FIG. 8a, the thermoplastic material is introduced into the mould. When the pressure of the material becomes sufficient, the sub-block 51 is thrust downwards, whilst thrusting the lugs into the recesses 54, such that the sub-blocks 51 and 52 are released from one another, and go into the position represented in FIG. 8b, thus opening up to a large extent the gap between the surfaces 11 and 6, in order to permit filling of the cavities 12. Once the part has cooled, the ejectors 58 thrust the part to the exterior of the mould, and the traction force of the moulded hooks is sufficient to return the two sub-blocks into the position in FIG. 8a.

In the present invention, upper surface of the insert block (with the reference 6 in the figures) means all of the points on the outer surface of the insert block which are seen when the block is viewed from above in a vertical direction. The central part (with the reference 6' in the figures) also means the upper surface of the part of the central surface into which there open all the cavities which are designed to form hooks, and which is delimited by the points furthest to the exterior of the edges furthest to the exterior of the openings of the cavities which are furthest to the exterior of all the cavities, and by the straight lines which connect these points to one another, such that the closed curve thus obtained includes all the cavities in its interior. Finally, the edge part (with the reference 6" in the figures) is the part of the upper surface on the exterior of the curve which delimits the central part. The edge part surrounds the central part.

What is claimed is:

1. A moulding device for forming a moulded article by injection of a thermoplastic moulding material, the device comprising
   an inner closed surface which defines a main moulding chamber,
   at least one introduction opening for introducing the thermoplastic moulding material into the moulding chamber,
   a field of cavities with a form complementary to hooks opening onto a first part of the inner surface, the first part of the inner surface being surrounded by an edge surface which does not comprise a cavity, and
   thrust means for thrusting at least a portion of the edge surface and an opposite part of the inner surface towards one another, the arrangement being such that the thrusting by the thrust means is limited, such that the edge surface and the opposite part which are thrust towards one another cannot come into complete contact with one another, a gap being thus formed between the edge surface and the opposite part, the gap being at least ten times smaller than the depth of the cavities with a form complementary to the hooks.

2. The moulding device of claim 1, wherein the gap is between 0.01 and 0.1 mm, this gap being measured in the direction perpendicular to the edge surface and the opposite part which face each other, at the point(s) of the edge surface furthest away from the opposite part.

3. The moulding device of claim 1, wherein the gap is at least a hundred times smaller than the depth of the cavities with a form complementary to the hooks.

4. The moulding device of claim 1, wherein the introduction opening opens into the moulding chamber at a part of the inner surface which does not comprise the opposite part.

5. The moulding device of claim 1, wherein the moulding chamber is devoid of any opening in the part of the inner surface opposite the first part and the edge surface.

6. The moulding device of claim 1, wherein the thrust means comprises at least one spring.

7. The moulding device of claim 1, wherein the thrust means comprises a hydraulic or pneumatic jack.

8. The moulding device of claim 1, comprising an insert block disposed in a detachable manner within the moulding cavity, the insert block comprising an upper surface forming a part of the inner surface of the mould, and the thrust means are integrated in the insert block.

9. The moulding device of claim 8, wherein the central part of the upper surface of the insert block forms the first part of the inner surface.

10. The moulding device of claim 9, wherein the edge surface is curved.

11. The moulding device of claim 9, wherein the edge surface comprises a shoulder relative to the central part.

12. The moulding device of claim 9, wherein the edge surface comprises a curvature projecting relative to the central part, the thrust means thrusting the top of the curvature into contact with the opposite part.

13. The moulding device of claim 9, wherein protuberances project from the surface of the central part.

14. The moulding device of claim 9, wherein the edge surface is thrust by the thrust means, and the first part is secured relative to the opposite part and spaced from the latter.

15. The moulding device of claim 9, wherein the edge surface has a part which is eccentric.

16. The moulding device of claim 1, wherein the width, or smallest transverse dimension, of each cavity, measured transversely to the longitudinal axis thereof, is smaller than the largest height of the moulding chamber, measured along the longitudinal axis of the cavity.

17. The moulding device of claim 1, wherein the total volume of the cavities forming the field of cavities is at least 100 times smaller than the largest volume of the moulding chamber.

18. A moulding device for forming a molded article by injection of a thermoplastic moulding material, the device comprising
   an inner closed surface which defines a main moulding chamber,
   at least one introduction opening for introducing the thermoplastic moulding material into the moulding chamber,
   a field of cavities with a form complementary to hooks opening onto a first part of the inner surface, the first part of the inner surface being surrounded by an edge surface which does not comprise a cavity, and
   thrust means for thrusting at least a portion of the edge surface and an opposite part of the inner surface towards one another, the arrangement being such that the thrusting by the thrust means is limited, such that the edge surface and the opposite part which are thrust towards one another cannot come into complete contact with one another, a gap being thus formed between the edge surface and the opposite part, the gap being dimensioned so that the moulding material cannot penetrate into the cap unless a pressure corresponding to a pressure which prevails when substantially all of the chamber is filled with moulding material is applied to the gap.

* * * * *